(12) United States Patent
Jin et al.

(10) Patent No.: US 12,341,219 B2
(45) Date of Patent: Jun. 24, 2025

(54) BATTERY PACK WITH FIXING BAR, AND ELECTRONIC DEVICE AND AUTOMOBILE COMPRISING SAME

(71) Applicant: LG Energy Solution, Ltd., Seoul (KR)

(72) Inventors: Hee-Jun Jin, Daejeon (KR); Jung-Hoon Lee, Daejeon (KR); Kyung-Mo Kim, Daejeon (KR); Jeong-O Mun, Daejeon (KR); Jin-Yong Park, Daejeon (KR); Jhin-Ha Park, Daejeon (KR); Ho-June Chi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 567 days.

(21) Appl. No.: 17/629,185

(22) PCT Filed: Jul. 15, 2020

(86) PCT No.: PCT/KR2020/009344
§ 371 (c)(1),
(2) Date: Jan. 21, 2022

(87) PCT Pub. No.: WO2021/025321
PCT Pub. Date: Feb. 11, 2021

(65) Prior Publication Data
US 2022/0255191 A1 Aug. 11, 2022

(30) Foreign Application Priority Data
Aug. 5, 2019 (KR) .................. 10-2019-0095072

(51) Int. Cl.
*H01M 50/503* (2021.01)
*H01M 10/625* (2014.01)
(Continued)

(52) U.S. Cl.
CPC ....... *H01M 50/503* (2021.01); *H01M 10/625* (2015.04); *H01M 10/6551* (2015.04);
(Continued)

(58) Field of Classification Search
CPC .. H01M 50/503; H01M 50/213; H01M 50/30; H01M 50/249; H01M 50/20;
(Continued)

(56) References Cited

U.S. PATENT DOCUMENTS

2008/0090137 A1* 4/2008 Buck ................... H01M 50/503
429/153
2008/0113229 A1 5/2008 Oh
(Continued)

FOREIGN PATENT DOCUMENTS

CN 201893408 U 7/2011
CN 106684280 A 5/2017
(Continued)

OTHER PUBLICATIONS

International Search Report for Application No. PCT/KR2020/009344 mailed Oct. 29, 2020, 2 pages.
(Continued)

*Primary Examiner* — Matthew W Van Oudenaren
(74) *Attorney, Agent, or Firm* — Lerner David LLP

(57) ABSTRACT

Disclosed is a battery pack with increased fabrication efficiency. To achieve the object, the battery pack according to the present disclosure includes at least one battery module including a plurality of secondary batteries placed and arranged in a horizontal direction and electrically connected to each other, and a cell frame having a fixing tube configured to fix the plurality of secondary batteries in a predetermined arrangement, the fixing tube being disposed between the plurality of secondary batteries, extending in the horizontal direction and having two open ends, and a
(Continued)

fixing rod extending in a direction and inserted into the fixing tube in the horizontal direction.

12 Claims, 11 Drawing Sheets

(51) Int. Cl.
*H01M 10/6551* (2014.01)
*H01M 50/213* (2021.01)
*H01M 50/30* (2021.01)

(52) U.S. Cl.
CPC ......... *H01M 50/213* (2021.01); *H01M 50/30* (2021.01); *H01M 2220/20* (2013.01)

(58) Field of Classification Search
CPC ........... H01M 10/625; H01M 10/6551; H01M 10/613; H01M 10/643; H01M 10/653; H01M 10/658; H01M 10/6554; H01M 10/623; H01M 2220/20; H01M 2220/30
See application file for complete search history.

(56) References Cited

U.S. PATENT DOCUMENTS

| | | | |
|---|---|---|---|
| 2009/0111015 A1 | 4/2009 | Wood et al. | |
| 2009/0123819 A1 | 5/2009 | Kim | |
| 2011/0217587 A1 | 9/2011 | An et al. | |
| 2012/0070711 A1* | 3/2012 | Souki | H01M 10/6566 429/120 |
| 2013/0224564 A1* | 8/2013 | Kim | H01M 50/209 429/158 |
| 2015/0162581 A1 | 6/2015 | Chan | |
| 2015/0338471 A1* | 11/2015 | Ichikawa | H01M 50/204 324/430 |
| 2016/0006006 A1 | 1/2016 | Motokawa et al. | |
| 2016/0093934 A1* | 3/2016 | Obasih | H01M 10/0525 429/71 |
| 2018/0130981 A1 | 5/2018 | Liu et al. | |

FOREIGN PATENT DOCUMENTS

| | | | |
|---|---|---|---|
| CN | 206349468 | * | 7/2017 |
| CN | 206349468 U | | 7/2017 |
| EP | 2022110 A1 | | 2/2009 |
| JP | 2009266653 | * | 11/2009 |
| JP | 2009266653 A | | 11/2009 |
| JP | 2010225337 A | | 10/2010 |
| JP | 201499312 A | | 5/2014 |
| JP | 2014160551 A | | 9/2014 |
| JP | 2017224627 A | | 12/2017 |
| KR | 100804702 B1 | | 2/2008 |
| KR | 20090048861 A | | 5/2009 |
| KR | 20110099979 A | | 9/2011 |
| KR | 20120029561 A | | 3/2012 |
| KR | 20140008123 A | | 1/2014 |
| KR | 101424668 B1 | | 8/2014 |
| KR | 101424668 | * | 9/2014 |
| KR | 20180055671 A | | 5/2018 |
| KR | 20190023917 A | | 3/2019 |
| WO | 2007134198 A1 | | 11/2007 |

OTHER PUBLICATIONS

Extended European Search Report for Application No. 20849587.9 dated Jul. 8, 2022. 6 pgs.

* cited by examiner

BATTERY PACK WITH FIXING BAR, AND ELECTRONIC DEVICE AND AUTOMOBILE COMPRISING SAME

CROSS-REFERENCE TO RELATED APPLICATIONS

The present application is a national stage entry under 35 U.S.C. § 371 of International Patent application No. PCT/KR2020/009344, filed on Jul. 15, 2020, published in Korean, which claims priority to Korean Patent Application No. 10-2019-0095072, filed on Aug. 5, 2019, the entire contents of which are hereby incorporated by reference herein.

TECHNICAL FIELD

The present disclosure relates to a battery pack having a fixing rod, and an electronic device and a vehicle comprising the same, and more particularly, to a battery pack with increased fabrication efficiency and an electronic device and a vehicle comprising the same.

BACKGROUND ART

Secondary batteries have high applicability to various products and electrical properties such as a high energy density. The secondary batteries are not only applied to portable electronic devices, but also Electric Vehicles (EVs), Hybrid Electric Vehicles (HEVs) or energy storage systems that are driven by an electric driving source.

The secondary batteries are gaining attention for their advantage of remarkably reducing the use of fossil fuels and not generating by-products from the use of energy, making them a new eco-friendly and energy efficient source of energy.

A battery pack used for electric vehicles includes a plurality of battery modules connected to each other, each battery module including a plurality of battery cells, to obtain high output. Each battery cell includes an electrode assembly including positive and negative electrode current collectors, a separator, an active material and an electrolyte solution, and can repeatedly recharged by electrochemical reactions between the components.

Recently, with the use as a source of energy and the growing need for large-capacity structures, there is an increasing demand for battery packs of a multi module structure including a plurality of battery modules including a plurality of secondary batteries connected in series and/or in parallel. In this instance, the battery pack includes the battery modules arranged closely to each other so as to receive many secondary batteries in a limited space.

In an example of the battery pack, the plurality of battery modules is fixed in a tray. For example, each corner of the battery module is fixed onto the tray using a plurality of long bolts. In another example of the battery pack, a flange extending in the outward direction from each of the plurality of battery modules is fixed onto the tray using a plurality of long bolts.

However, this coupling method needs the plurality of long bolts for each of the plurality of battery modules. Accordingly, in the fabrication process, the bolting operation of the long bolts requires a very long time, and it is very difficult to reduce the fabrication time. Moreover, the plurality of long bolts increases the weight of the battery pack.

DISCLOSURE

Technical Problem

The present disclosure is designed to solve the above-described problem, and therefore the present disclosure is directed to providing a battery pack of which the fabrication time is effectively reduced through a simple fabrication process, and an electronic device and a vehicle comprising the same.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

To achieve the above-described object, a battery pack according to the present disclosure includes at least one battery module including a plurality of secondary batteries placed and arranged in a horizontal direction and electrically connected to each other, and a cell frame having a fixing tube configured to fix the plurality of secondary batteries in a predetermined arrangement, the fixing tube being disposed between the plurality of secondary batteries, extending in the horizontal direction and having two open ends, and a fixing rod extending in a direction and inserted into the fixing tube in the horizontal direction.

Additionally, the battery pack may further include a pack tray including a base plate on which the at least one battery module is mounted and a fixing wall extending in an upward direction from an upper surface of the base plate, and two ends of the fixing rod may be fixed to the fixing wall provided in the pack tray.

Additionally, a fixing groove may be recessed in a downward direction partially from top of the fixing wall of the pack tray, into which one end or the other end of the fixing rod is inserted and fixed.

Additionally, a press-fit groove may be recessed in an inward direction from top of the fixing wall of the pack tray, into which one end or the other end of the fixing rod is press-fit and fixed.

Additionally, the fixing rod may include a press member configured to press the battery module toward the fixing wall of the pack tray.

Additionally, a male screw may be formed in at least part of an outer surface of the fixing rod, and the press member may be a press nut having a female screw to move along the male screw of the fixing rod.

Additionally, the battery pack may further include a heat sink interposed between the two or more battery modules, Additionally, two or more fixing rods may be provided, the two or more battery modules may be respectively penetrated by the two or more fixing rods through the fixing tube, and two or more insertion grooves recessed in an upward direction may be provided below the heat sink, into which part of each of the two or more fixing rods is inserted.

Additionally, a thermally conductive pad may be provided between the battery module and the heat sink, and the thermally conductive pad may have a gas vent groove extending in upward-downward and frontward-rearward directions and recessed in an inward direction of the thermally conductive pad.

Additionally, the battery pack may further include a cross beam disposed on the base plate of the pack tray and configured to be coupled to the two or more fixing rods.

To achieve the above-described object, an electronic device according to the present disclosure includes the battery pack.

To achieve the above-described object, a vehicle according to the present disclosure includes the battery pack.

Advantageous Effects

According to an aspect of the present disclosure, the battery pack of the present disclosure includes the fixing rod horizontally inserted into the fixing tube provided in at least one battery module, so that a plurality of secondary batteries may be arranged in a direction and fixed by simply inserting the fixing rod to prevent them from moving up and down. Accordingly, compared to the battery pack using a plurality of long bolts to fix battery modules, it is possible to effectively shorten the fabrication time of the battery pack, and effectively reduce the weight of the battery pack.

According to this aspect of the present disclosure, the present disclosure fixes two ends of the fixing rod to which at least one battery module is fixed to the fixing wall provided in the pack tray, so that the plurality of battery modules may be fixed and coupled into the pack tray by simply mounting the plurality of battery modules in the pack tray of the battery pack. Accordingly, it is possible to effectively shorten the fabrication time of the battery pack, and greatly reduce the use of a separate fixing element.

According to another aspect of the present disclosure, the press-fit groove is recessed in the inward direction from top of the fixing wall of the pack tray, and one end or the other end of the fixing rod is press-fit and fixed into the press-fit groove, and thus two ends of the fixing rod coupled to at least one battery module may be inserted and coupled to the press-fit groove, and the at least one battery module may be mounted and fixed to the pack tray to prevent from moving back and forth, up and down, and to the left and right. Accordingly, it is possible to simplify the fabrication process of the battery pack and shorten the fabrication time.

According to this aspect of the present disclosure, the fixing rod of the present disclosure includes the press member configured to press the battery module toward the fixing wall of the pack tray, so that the plurality of battery modules may be easily fixed into the pack tray using the press member. Accordingly, the present disclosure may reduce the number of coupling elements and minimize the coupling process time.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Figure 1:
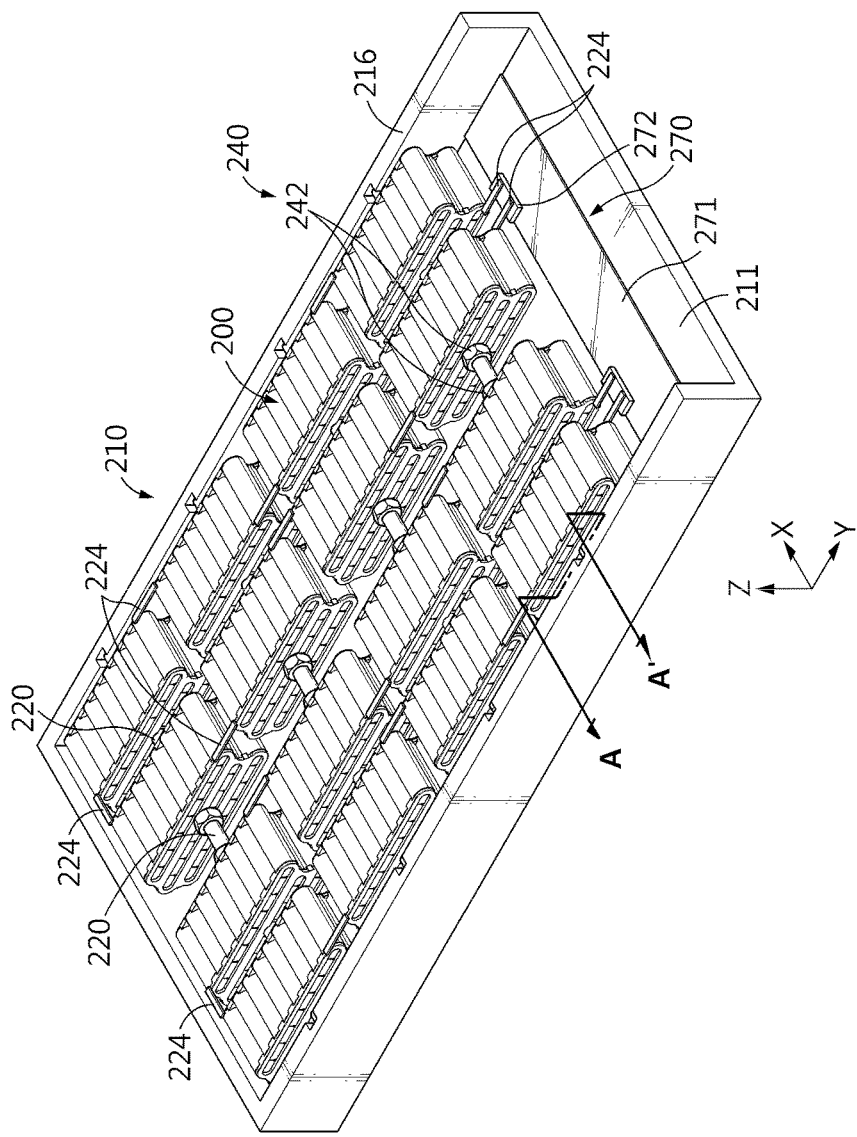
FIG. 1 is a schematic perspective view of a battery pack according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
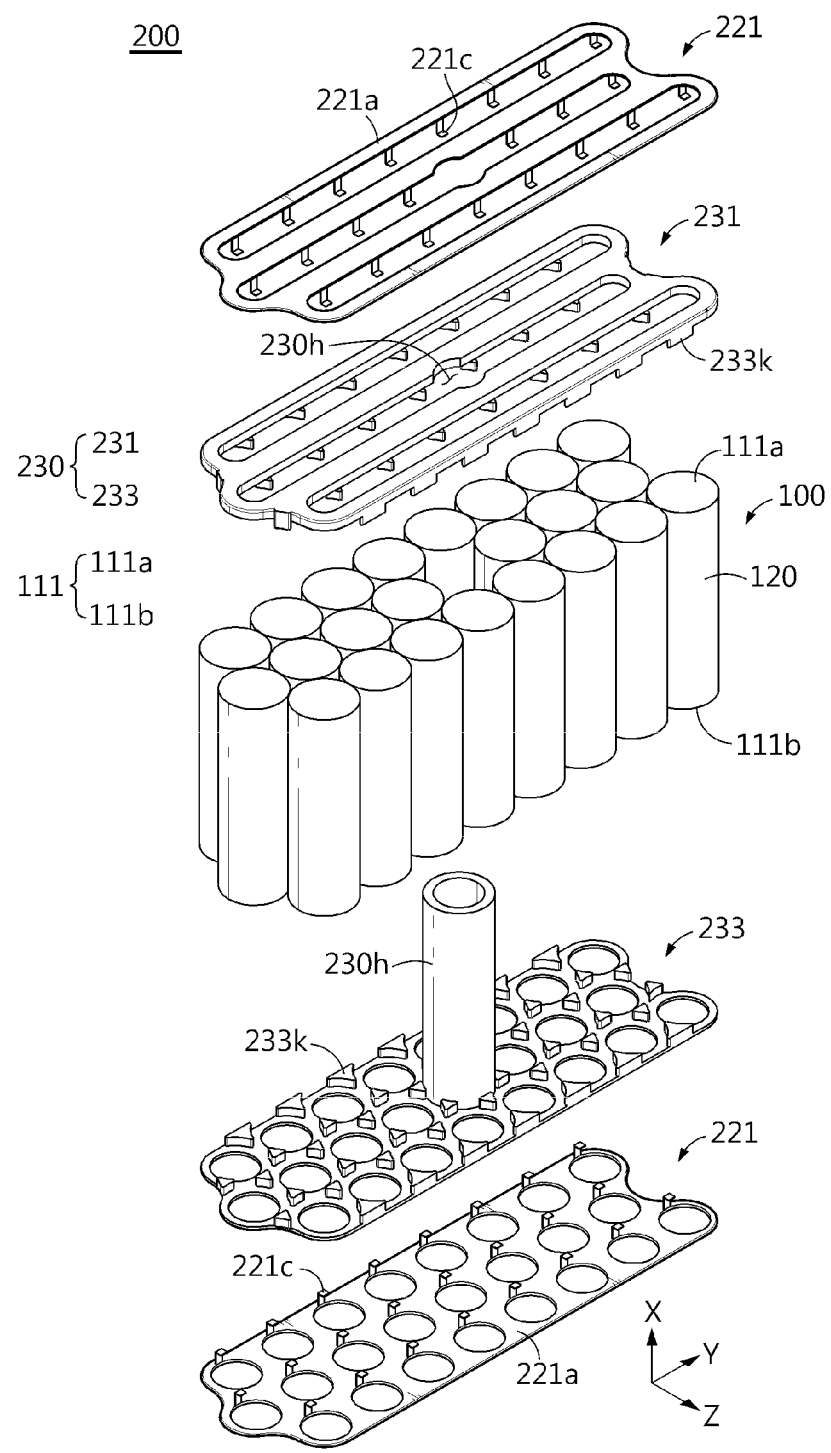
FIG. 2 is a schematic partial exploded perspective view of a battery pack according to an embodiment of the present disclosure.

FIG. 1 is a schematic perspective view of a battery pack according to an embodiment of the present disclosure. FIG. 2 is a schematic partial exploded perspective view of the battery pack according to an embodiment of the present disclosure.

Referring to FIGS. 1 and 2, the battery pack 300 of the present disclosure includes at least one battery module 200 and a fixing rod 220 coupled to the at least one battery module 200.

Here, the battery module 200 may include a plurality of secondary batteries 100. The secondary battery 100 may be a cylindrical battery cell 100. The cylindrical battery cell 100 may include a cylindrical battery can 120, and an electrode assembly (not shown) received in the battery can 120.

The cylindrical battery cell 100 may include the battery can 120 standing upright in a vertical direction. The battery can 120 may include a material having high electrical conductivity, for example, an aluminum alloy or a copper alloy.

2 electrode terminals 111 may be formed on top and bottom of the battery can 120 respectively. In detail, a positive electrode terminal 111a may be formed on a flat circular upper surface on top of the battery can 120, and a negative electrode terminal 111*b* may be formed on a flat circular lower surface on bottom of the battery can 120.

The battery can 120 may be coated with an electrical insulating element on the side.

That is, the battery can 120 is electrically connected to an electrode (not shown) of the electrode assembly inside, and its side may be coated with an insulating film (not shown) or an electrical insulating adhesive as the insulating element to prevent electrical leakage caused by the contact between an unintentional conductive object and the battery can 120.

The electrode assembly (not shown) may be formed by winding, into a jelly-roll shape, the positive electrode including a positive electrode plate coated with a positive electrode active material and the negative electrode including a negative electrode plate coated with a negative electrode active material with a separator interposed between the positive electrode and the negative electrode. The positive electrode (not shown) may have a positive electrode tab attached thereto, and the positive electrode tab may be electrically connected to the positive electrode terminal 111*a* on top of the battery can 120. The negative electrode (not shown) may have a negative electrode tab attached thereto, and the negative electrode tab may be electrically connected to the negative electrode terminal 111*b* on bottom of the battery can 120.

The plurality of cylindrical battery cells 100 may be placed in a horizontal direction and arranged in the left-right direction (x direction).

When the plurality of secondary batteries 100 is mounted on the upper surface of a base plate 211 as described below, the plurality of secondary batteries 100 may be placed and arranged in in the horizontal direction.

Here, the horizontal direction refers to a direction parallel to the ground when the cylindrical battery cell 100 is placed on the ground, and may be at least one direction on the plane perpendicular to the vertical direction.

For example, as shown in FIG. 2, the battery module 200 includes 23 cylindrical battery cells 100. The 23 cylindrical battery cells 100 may stand upright in the vertical direction within the cell frame 230 and be arranged closely to each other in the horizontal direction.

Referring back to FIGS. 1 and 2, the battery module 200 may include a cell frame 230 including an upper plate 231 and a lower plate 233. The cell frame 230 may include an electrical insulating material. For example, the electrical insulating material may be plastic having an electrical insulating property. The plastic may be preferably polyvinyl chloride.

In detail, the cell frame 230 may be configured to fix the plurality of secondary batteries 100 in a predetermined arrangement. For example, the cell frame 230 may include the upper plate 231 mounted on the plurality of secondary batteries 100 and the lower plate 233 mounted below the plurality of secondary batteries 100. At least one of the upper plate 231 or the lower plate 233 may include a plurality of fixing protrusions 233*k* to support part of each of the plurality of secondary batteries 100 in order to fix the position of each of the plurality of secondary batteries 100.

In another example, at least one of the upper plate 231 or the lower plate 233 may have a plurality of section grooves (not shown) to fix the position of the plurality of secondary batteries 100.

A busbar 221 may be mounted on the upper surface of the upper plate 231. Here, the busbar 221 may include a body 221*a* disposed facing the electrode terminal 111 of the plurality of secondary batteries 100. At least one connection terminal 221*c* may be provided at part of the body 221*a* of the busbar 221 and come into contact with the electrode terminal 111 of the plurality of secondary batteries 100.

For example, as shown in FIG. 2, the upper plate 231 is mounted on the battery module 200. The busbar 221 may be mounted on the upper surface of the upper plate 231. The upper plate 231 may have 3 openings that are open in the vertical direction to bring the connection terminal 221*c* of the busbar 221 and the electrode terminal 111 of the plurality of secondary batteries 100 into contact with each other.

The busbar 221 may be mounted on the lower surface of the lower plate 233. Here, the busbar 221 may include the body 221*a* disposed in contact with the electrode terminal 111 of the plurality of secondary batteries 100. At least one connection terminal 221*c* may be provided at part of the body 221*a* of the busbar 221 and come into contact with the electrode terminal 111 of the plurality of secondary batteries 100.

The busbar 221 may include an electrically conductive material. For example, the electrically conductive material may be a metal alloy including copper, nickel, aluminum, gold and silver as the main material.

For example, as shown in FIG. 2, the lower plate 233 is mounted below the plurality of secondary batteries 100. The busbar 221 is mounted on the lower surface of the lower plate 233. The lower plate 233 may have 23 openings that are open in the vertical direction to bring the connection terminal 221*c* of the busbar 221 and the electrode terminal 111 of the plurality of secondary batteries 100 into contact with each other.

However, the busbar of the present disclosure is not necessarily limited to this shape, and may electrically connect the plurality of secondary batteries 100 in series or in parallel through a metal wire (not shown). For example, an electrical connection may be established between a connecting busbar 224 as described below and the plurality of secondary batteries 100 through the metal wire.

The battery pack 300 may further include a connecting busbar 224 electrically connecting the plurality of battery modules 200. The connecting busbar 224 may include an electrically conductive material. For example, the electrically conductive material may be a metal alloy including copper, nickel, aluminum, gold and silver as the main material. The connecting busbar 224 may be configured to contact or be connected to the busbar 221 provided in each of the plurality of battery modules 200. For example, as shown in FIG. 1, 14 connecting busbars 224 may be provided to electrically connect the plurality of battery modules 200.

The plurality of secondary batteries 100 may be electrically connected to the connecting busbar 224 through the busbar 221. That is, part of the busbar 221 may be electrically connected to the connecting busbar 224.

The battery pack 300 may further include a battery management system (BMS) 270 configured to control the charge/discharge current of the battery module 200. The battery management system 270 may include a protection circuit board 271. The plurality of battery modules 200 may be electrically connected to the connecting busbar 224 through a connection terminal 272 of the protection circuit board 271.

The cell frame 230 may include a fixing tube 230*h* disposed between the plurality of secondary batteries 100. The fixing tube 230*h* may extend in the horizontal direction and have two open ends. For example, the fixing tube 230*h* may be provided between the upper plate 231 and the lower plate 233 of the cell frame 230.

For example, as shown in FIG. 2, the fixing tube 230h may be disposed at the center of each of the upper plate 231 and the lower plate 233.

For example, as shown in FIG. 2, the fixing tube 230h extending in the upward direction may be provided at the center of the lower plate 233.

The fixing rod 220 may be a cylindrical rod extending in a direction. The fixing rod 220 may be inserted into the fixing tube 230h in the horizontal direction. The battery module 200 may be configured to be moveable in the insertion direction of the fixing rod 220 on the fixing rod 220.

For example, as shown in FIG. 1, the battery pack 300 may be configured to fix 4 battery modules 200 using one fixing rod 220. Each of the 4 battery modules 200 has the fixing tube 230h, and the plurality of battery modules 200 may be arranged in a direction by inserting the cylindrical fixing rod 220 into each fixing tube 230h in the horizontal direction (left-right direction, x direction).

According to this configuration of the present disclosure, the battery pack 300 of the present disclosure includes the fixing rod 220 horizontally inserted into the fixing tube 230h provided in at least one battery module 200, so that the plurality of secondary batteries 100 may be arranged in a direction and fixed to prevent them from moving up and down by simply inserting the fixing rod 220. Accordingly, compared to the battery pack 300 using a plurality of long bolts to fix the plurality of battery modules 200, it is possible to effectively shorten the fabrication time of the battery pack 300 and effectively reduce the weight of the battery pack 300.

Referring back to FIGS. 1 and 2, the battery pack 300 may further include a pack tray 210 including a base plate 211 and a fixing wall 216 provided on the upper surface of the base plate 211.

In detail, the base plate 211 may have a larger area than the total size of the lower surface of the at least one battery module 200 so that the at least one battery module 200 is mounted on the base plate 211. The base plate 211 may be in the shape of a plate that extends in the horizontal direction. The base plate 211 may have a flat upper surface.

The fixing wall 216 may extend in the upward direction from the upper surface of the base plate 211. For example, the fixing wall 216 may be provided on the outer periphery of the base plate 211 or at the end in the horizontal direction (x or y direction). For example, as shown in FIG. 1, the pack tray 210 may include the base plate 211 on which 16 battery modules 200 are mounted and the fixing wall 216 extending in the upward direction (z direction) from each of the left end, the right end and the rear end on the upper surface of the base plate 211.

The left and right ends (x direction) of the fixing rod 220 may be fixed to the fixing wall 216 provided in the pack tray 210. For example, as shown in FIG. 1, the two ends of the fixing rod 220 may be coupled to the fixing wall 216 provided in each of the left and right ends (x direction) of the pack tray 210.

According to this configuration of the present disclosure, the two ends of the fixing rod 220 to which at least one battery module 200 is fixed to the fixing wall 216 provided in the pack tray 210 of the present disclosure, so that the plurality of battery modules 200 may be fixed and coupled into the pack tray 210 by simply mounting the plurality of battery modules 200 in the pack tray 210 of the battery pack 300. Accordingly, it is possible to effectively shorten the fabrication time of the battery pack 300 and greatly reduce the use of a separate fixing element (a long bolt).

Figure 3:
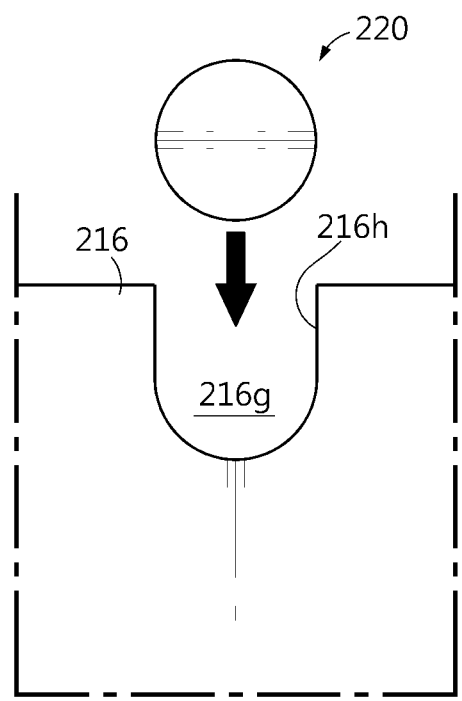
FIG. 3 is a schematic partial cross-sectional view of the battery module of FIG. 1, taken along the A-A'.

FIG. 3 is a schematic partial cross-sectional view of the battery module of FIG. 1, taken along the A-A'.

Referring to FIG. 3 together with FIG. 1, the fixing wall 216 of the pack tray 210 may have a fixing groove 216g into which one end or the other end of the fixing rod 220 is inserted and fixed. The fixing groove 216g may be provided on top or bottom of the fixing wall 216 or between the top and the bottom. For example, as shown in FIG. 3, the fixing wall 216 may have the fixing groove 216g recessed in the downward direction from part of the upper surface. In this instance, an inner surface 216h of the fixing groove 216g may be configured to support the end of the fixing rod 220 in Y direction.

According to this configuration of the present disclosure, the fixing groove 216g is recessed in the downward direction partially from the top of the fixing wall 216 of the pack tray 210, into which one end or the other end of the fixing rod 220 may be inserted and fixed, so that the at least one battery module 200 may be mounted on the pack tray 210 by inserting the two ends of the fixing rod 220 coupled to the at least one battery module 200 into the fixing groove 216g provided in the fixing wall 216 of the pack tray 210. The fixing rod 220 may mount the at least one battery module 200 on the pack tray 210 and fix to prevent from moving back and forth and to the left and right. Accordingly, it is possible to simplify the fabrication process of the battery pack 300 and reduce the fabrication time.

Figure 4:
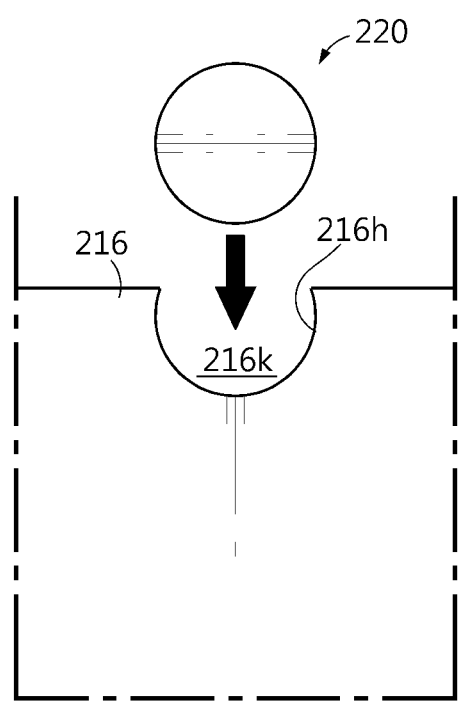
FIG. 4 is a schematic partial cross-sectional view of a battery module of a battery pack according to another embodiment of the present disclosure.

FIG. 4 is a schematic partial cross-sectional view of the battery module of the battery pack according to another embodiment of the present disclosure.

Referring to FIG. 4 together with FIG. 1, a press-fit groove 216k may be recessed in the inward direction in the fixing wall 216 of the pack tray 210, into which one end or the other end of the fixing rod 220 may be press-fit and fixed. For example, as shown in FIG. 4, the press-fit groove 216k recessed in the downward direction from the upper surface may be provided on top of the fixing wall 216. The inner surface 216h of the press-fit groove 216k may be formed around the outer surface of the end of the fixing rod 220. In this instance, the entry side (top) of the press-fit groove 216k may be narrower than the cross-sectional diameter of the fixing rod 220.

That is, due to the narrow entry side of the press-fit groove 216k, one end or the other end of the fixing rod 220 may be press-fit. Accordingly, the press-fit fixing rod 220 may be fixed into the press-fit groove 216k to prevent slips or movements.

According to this configuration of the present disclosure, the press-fit groove 216k is recessed in the inward direction on top of the fixing wall 216 of the pack tray 210, into which one end or the other end of the fixing rod 220 is press-fit and fixed, so that the two ends of the fixing rod 220 coupled to the at least one battery module 200 may be inserted and coupled to the press-fit groove 216k, and the at least one battery module 200 may be mounted and fixed to the pack tray 210 to prevent from moving back and forth, up and down and to the left and right. Accordingly, it is possible to simply the fabrication process of the battery pack 300 and reduce the fabrication time.

Figure 5:
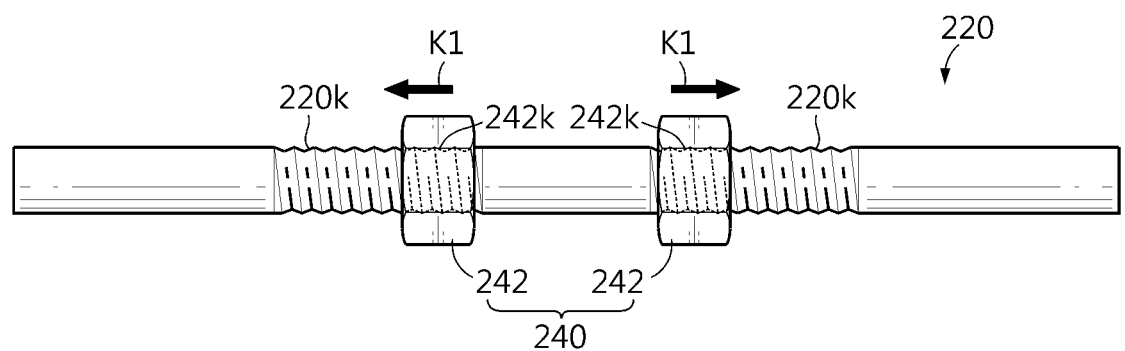
FIG. 5 is a schematic front view of some components of a battery pack according to an embodiment of the present disclosure.
Figure 6:
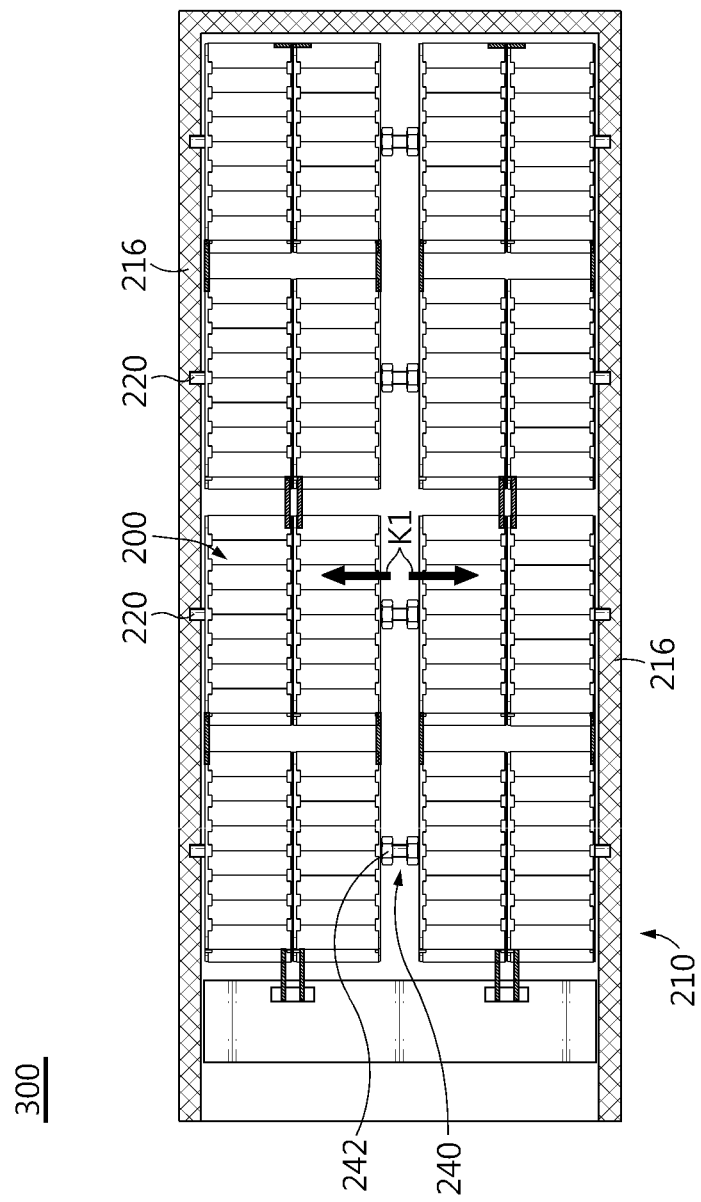
FIG. 6 is a schematic plane view of a battery pack according to an embodiment of the present disclosure.

FIG. 5 is a schematic front view of some components of the battery pack according to an embodiment of the present disclosure. FIG. 6 is a schematic plane view of the battery pack according to an embodiment of the present disclosure. Here, for convenience of description of the drawing, FIG. 5 shows a press nut 242 in vertical cross section.

Referring to FIGS. 5 and 6 together with FIG. 1, the fixing rod 220 may include a press member 240. The press member 240 may be configured to press the battery module 200 toward the fixing wall 216 of the pack tray 210. For example, the press member 240 may be a spring and a nut provided moveably to the left and right (x direction in FIG. 1) on the fixing rod 220.

For example, as shown in FIG. 1, one fixing rod 220 may include two press members 240. Each of the two press members 240 may be configured to move in the direction K1 toward the fixing wall 216 of the pack tray 210 to which the two ends of the fixing rod 220 are coupled.

The press member 240 may press the battery module 200 by moving toward the fixing wall 216 of the pack tray 210. The battery module 200 may come into close contact with the fixing wall 216 of the pack tray 210 by the press member 240. The battery module 200 may be fixed between the press member 240 and the fixing wall 216 of the pack tray 210 by a pressing force.

Referring back to FIGS. 1 and 5, a male screw 220k may be formed on at least part of the outer surface of the fixing rod 220. For example, as shown in FIG. 5, the male screw 220k may be provided at two sides with respect to the center of the fixing rod 220.

The press member 240 may be the press nut 242 having a female screw 242k to move along the male screw 220k of the fixing rod 220. For example, as shown in FIG. 5, the fixing rod 220 may have 2 press nuts 242 configured to move to the left and right along 2 male screws 220k respectively. That is, the press nut 242 may press the at least one battery module 200 to fix the at least one battery module 200 in contact with the fixing wall 216.

According to this configuration of the present disclosure, the fixing rod 220 includes the press member 240 configured to press the battery module 200 toward the fixing wall 216 of the pack tray 210, thereby easily fixing the plurality of battery modules 200 into the pack tray 210 using the press member 240. Accordingly, the present disclosure can reduce the number of coupling elements and minimize the coupling process time.

Figure 7:
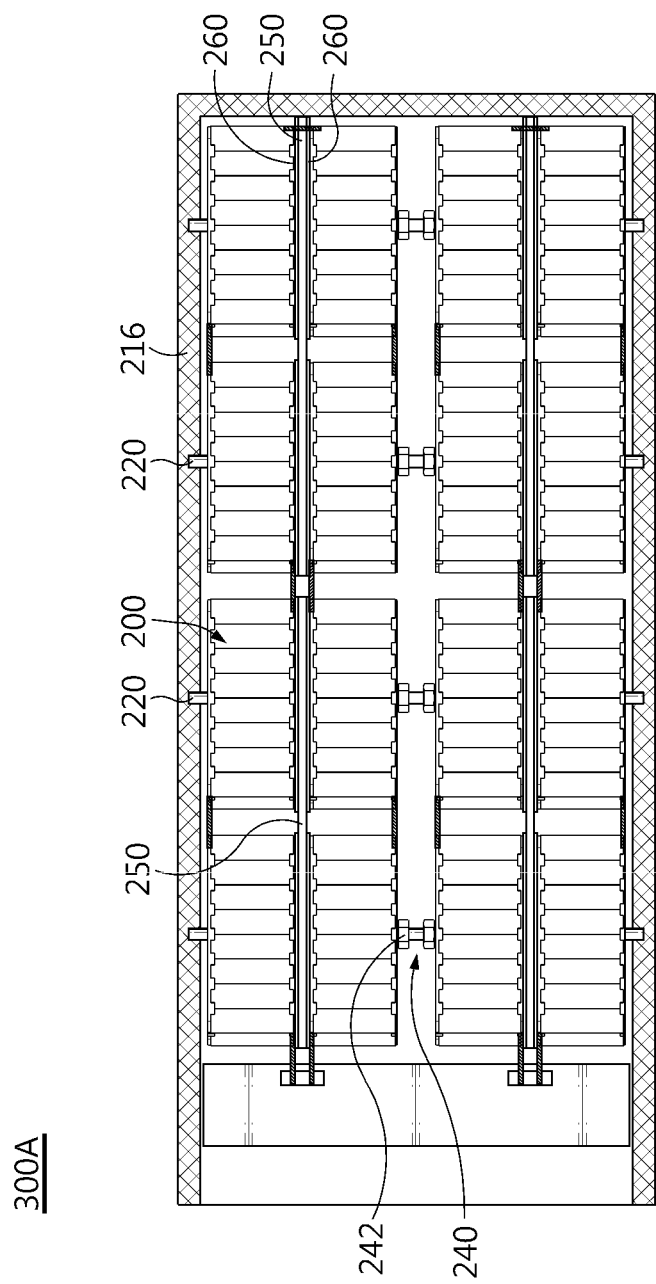
FIG. 7 is a schematic plane view of a battery pack according to another embodiment of the present disclosure.
Figure 8:
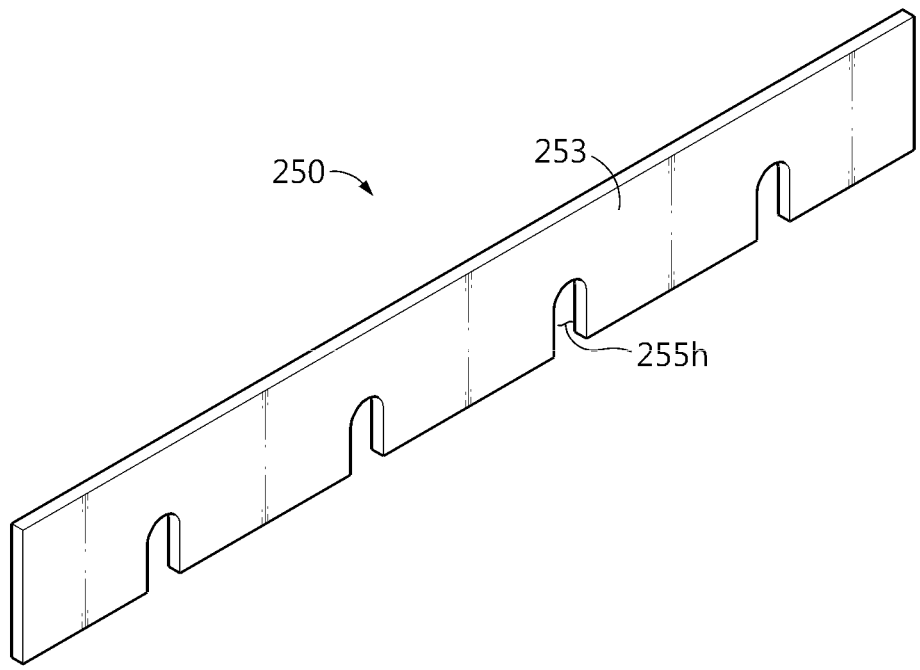
FIG. 8 is a schematic perspective view of some components of a battery pack according to another embodiment of the present disclosure.

FIG. 7 is a schematic plane view of a battery pack according to another embodiment of the present disclosure. FIG. 8 is a schematic perspective view of some components of the battery pack according to another embodiment of the present disclosure.

Referring to FIGS. 7 and 8, compared with the battery pack 300 of FIG. 1, the battery pack 300A of FIG. 7 further includes a heat sink 250 and a thermally conductive pad 260. The remaining elements are the same as those of the battery pack 300 of FIG. 1.

The battery pack 300A according to another embodiment of the present disclosure may include the two or more fixing rods 220. For example, as shown in FIG. 7, 4 fixing rods 220 may be mounted in the pack tray 210.

The two or more battery modules 200 may be penetrated by each of the two or more fixing rods 220 through the fixing tube (230h in FIG. 2). For example, as shown in FIG. 7, 4 battery modules 200 may be respectively inserted into 4 fixing rods 220 through the fixing tube 230h.

The battery pack 300A may further include the heat sink 250 interposed between the two or more battery modules 200. That is, each of the left and right sides of the heat sink 250 may be disposed in contact with the outer side surface of the battery module 200. Here, the heat sink 250 may have a coolant channel (not shown) through which a coolant moves. For example, the heat sink 250 may be in the shape of a box that is hollow and has a metal outer wall 253.

The heat sink 250 may have the coolant therein or may be continuously supplied with the coolant from the outside. For example, the coolant may be water, a Freon-based coolant, ammonia, acetone, methanol, ethanol, naphthalene, sulfur or mercury. The heat sink may be configured to have the coolant therein or be continuously supplied with the coolant from the outside, and at the same time, force the heated coolant out. A pump may be used to supply the coolant or force it out.

The heat sink 250 may have a coupling structure into which part of each of the two or more fixing rods 220 is inserted. For example, as shown in FIGS. 7 and 8, the coupling structure may have 4 insertion grooves 255h recessed in the upward direction from the lower surface of the heat sink 250. Parts of the 4 fixing rods 220 may be inserted into the 4 insertion grooves 255h respectively.

Due to the pressing by the press member 240, the contact area between the two or more battery modules 200 and the heat sink 250 may be increased.

According to this configuration of the present disclosure, the battery pack 300A further includes the heat sink 250 interposed between the two or more battery modules 200, so that the heat sink 250 may be easily coupled and installed between the plurality of battery modules 200. It is possible to effectively increase the coupling strength between the plurality of battery modules 200 pressed by the press member 240 and the heat sink 250, thereby greatly increasing the cooling efficiency of the battery pack 300A.

Figure 9:
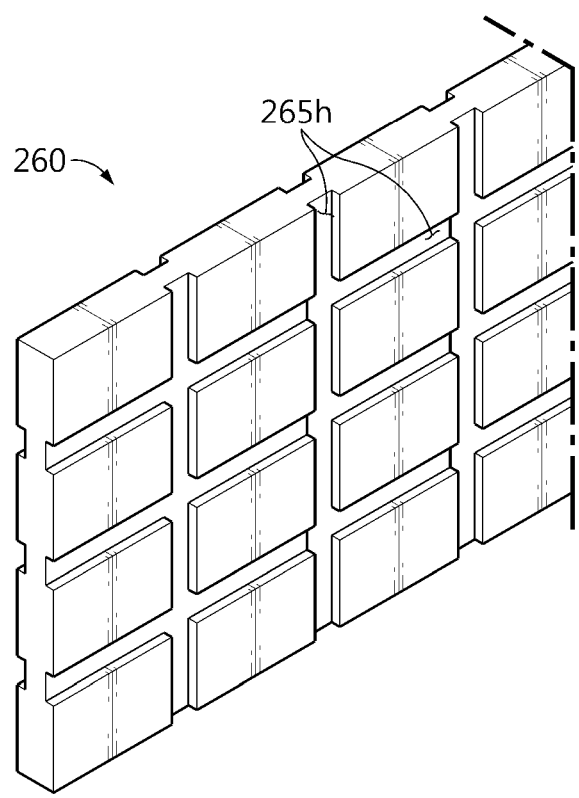
FIG. 9 is a schematic perspective view of some components of a battery pack according to another embodiment of the present disclosure.

FIG. 9 is a schematic perspective view of some components of the battery pack according to another embodiment of the present disclosure.

Referring to FIG. 9 together with FIG. 7, the battery pack 300A according to another embodiment may include the thermally conductive pad 260 between the battery module 200 and the heat sink 250. In detail, the thermally conductive pad 260 may include a material having high thermal conductivity at least in part. For example, the material having high thermal conductivity may be silicone polymer.

The thermally conductive pad 260 may extend in the upward-downward and frontward-rearward directions. For example, the thermally conductive pad 260 may be configured to wrap around the left and right sides of the heat sink 250. Alternatively, the thermally conductive pad 260 may be added to a region corresponding to the battery module 200 on the left and right sides of the heat sink 250. For example, as shown in FIG. 7, 8 thermally conductive pads 260 may be added to the left and right sides of the heat sink 250. The thermally conductive pad 260 may have a size corresponding to one side of the 8 battery modules 200.

A gas vent groove 265h recessed in the inward direction of the thermally conductive pad 260 may be formed. In detail, the gas vent groove 265h may extend linearly from top to bottom of the thermally conductive pad 260, or from the front end to the rear end, or may extend in four directions from top to bottom and from the front end to the rear end. In the plurality of secondary batteries 100 of the battery module 200, part in which a vent structure is provided (the positive electrode terminal is disposed) may be disposed in contact with the surface in which the gas vent groove 265h of the thermally conductive pad 260 is formed. For example, as shown in FIG. 9, the thermally conductive pad 260 may have the gas vent groove 265h extending in the upward, downward, forward and rearward directions.

Figure 10:
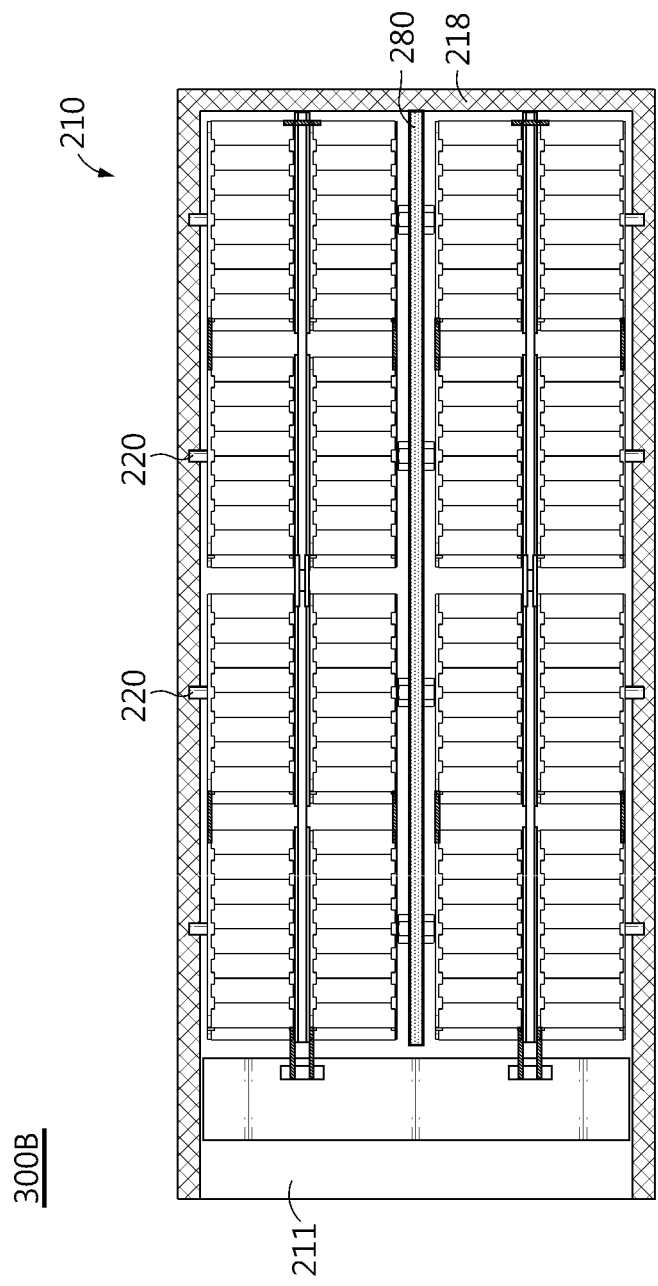
FIG. 10 is a schematic plane view of a battery pack according to still another embodiment of the present disclosure.
Figure 11:
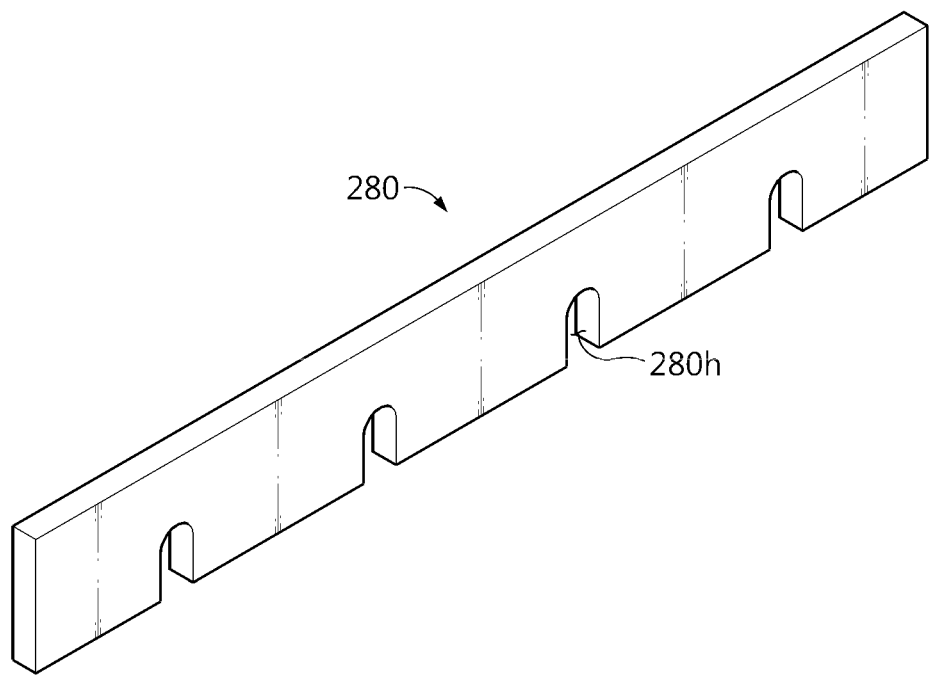
FIG. 11 is a schematic perspective view of some components of a battery pack according to still another embodiment of the present disclosure.

FIG. 10 is a schematic plane view of a battery pack according to still another embodiment of the present disclosure. FIG. 11 is a schematic perspective view of some components of the battery pack according to still another embodiment of the present disclosure.

Referring to FIGS. 10 and 11, compared with the battery pack 300A of FIG. 7, the battery pack 300B according to still another embodiment may further include a cross beam 280 disposed on the base plate 211 of the pack tray 210. The remaining elements are the same as those of the battery pack 300A of FIG. 7.

In detail, the cross beam 280 may be coupled to the plurality of fixing rods 220. The cross beam 280 may have a coupling structure into which part of each of the two or more fixing rods 220 is inserted. For example, as shown in FIGS. 10 and 11, the coupling structure may have 4 coupling grooves 280h recessed in the upward direction from the lower surface of the cross beam 280. Parts of the 4 fixing rods 220 may be inserted into the 4 coupling grooves 280h respectively.

The end of the cross beam 280 may be configured to be coupled to an outer sidewall 218 provided in the pack tray 210. For example, as shown in FIG. 10, the cross beam 280 extending in the frontward-rearward direction may be provided at the center of the pack tray 210. The rear end of the cross beam 280 may be coupled to the outer sidewall 218 provided in the pack tray 210.

According to this configuration of the present disclosure, the battery pack further includes the cross beam 280 disposed on the base plate 211 of the pack tray 210 and configured to be coupled to the plurality of fixing rods 220, and thus the cross beam 280 serves as a central axis of the structure of the battery pack 300B when coupled with the plurality of fixing rods 220, thereby effectively increasing the mechanical strength of the entire battery pack 300B, and in particular, it is possible to effectively prevent the fixing rod 220 from being deformed or broken by external impacts by coupling between the cross beam 280 and the plurality of fixing rods 220.

An electronic device according to the present disclosure may include the battery pack 300. The electronic device (not shown) may include a case (not shown) to receive the battery pack 300 therein.

A vehicle (not shown) according to the present disclosure may include the battery pack 300. The vehicle may be, for example, an electric vehicle having an electric motor (not shown) using the battery pack 300 as a source of power.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

| | | | |
|---|---|---|---|
| 300: | Battery pack | 100: | Secondary battery |
| 111, 111a, 111b: | Electrode terminal, Positive electrode terminal, Negative electrode terminal | | |
| 200: | Battery module | 220: | Fixing rod |
| 230: | Cell frame | 231, 233: | Upper plate, Lower plate |
| 230h: | Fixing tube | | |
| 210, 211: | Pack tray, Base plate | | |
| 216, 216g, 216k: | Fixing wall, Fixing groove, Press-fit groove | | |
| 240, 242: | Press member, Press nut | | |
| 220k, 242k: | Male screw, Female screw | 255h: | Insertion groove |
| 250: | Heat sink | 265h: | Gas vent groove |
| 260: | Thermally conductive pad | 270: | Battery management system |
| 280: | Cross beam | | |

INDUSTRIAL APPLICABILITY

The present disclosure relates to a battery pack with increased fabrication efficiency. In addition, the present disclosure can be used in the industry related to electronic devices and vehicles comprising the battery pack.

What is claimed is:

1. A battery pack comprising:
   at least one battery module, each battery module including a plurality of secondary batteries placed and arranged in a horizontal direction and electrically connected to each other, and each battery module including a cell frame having a fixing tube configured to fix the plurality of secondary batteries in a predetermined arrangement, the fixing tube being disposed between the plurality of secondary batteries, extending in the horizontal direction and having two open ends;
   a pack tray including a base plate on which the at least one battery module is mounted and a fixing wall extending in an upward direction from an upper surface of the base plate and extending along a periphery of the base plate; and
   a fixing rod extending in the horizontal direction and inserted into the fixing tube,
   wherein first and second opposite ends of the fixing rod are fixed to first and second opposite locations of the fixing wall, and
   wherein the fixing rod includes two press members, each of the two press members configured to move in the horizontal direction toward the first and second opposite locations of the fixing wall, to press first and second ones of the at least one battery module toward the fixing wall to fix the first and second ones of the at least one battery module in contact with the fixing wall, the two press members being disposed between the first and second ones of the at least one battery module.

2. The battery pack according to claim 1, wherein the fixing wall has a fixing groove partially recessed therein in a downward direction from a top of the fixing wall, the first end or the second end of the fixing rod being inserted into the fixing groove and fixed therein.

3. The battery pack according to claim 1, wherein the fixing wall has a press-fit groove recessed in an inward direction from a top of the fixing wall, the first end or the second end of the fixing rod being press-fit into the press-fit groove and fixed therein.

4. The battery pack according to claim 1, wherein the fixing rod has a male screw formed in at least part of an outer surface thereof, and each press member is a press nut having a female tapped opening therein, the press nut being configured to move along the male screw of the fixing rod.

5. The battery pack according to claim 1, wherein the fixing rod is a first fixing rod, the battery pack further includes a heat sink interposed between two or more of the battery modules, the battery pack further comprising:
two or more additional fixing rods, the two or more of the battery modules being respectively penetrated by the two or more additional fixing rods through respective ones of the fixing tubes; and
two or more insertion grooves recessed into the heat sink in an upward direction from a bottom of the heat sink, part of each of the two or more additional fixing rods being inserted into respective ones of the insertion grooves.

6. The battery pack according to claim 5, further comprising a thermally conductive pad provided between some of the battery modules and the heat sink, wherein the thermally conductive pad has gas vent grooves extending in upward-downward and frontward-rearward directions, the gas vent grooves being recessed into the thermally conductive pad in an inward direction.

7. The battery pack according to claim 5, further comprising:
a cross beam disposed on the base plate of the pack tray and coupled to the first fixing rod and the two or more additional fixing rods.

8. An electronic device comprising the battery pack according to claim 1.

9. A vehicle comprising the battery pack according to claim 1.

10. The battery pack according to claim 1, wherein the fixing tube has an outer diameter equal to an outer diameter of each of the plurality of secondary batteries.

11. The battery pack according to claim 10, wherein the fixing tube contacts six of the secondary batteries that together extend completely around the fixing tube in a circumferential direction of the fixing tube.

12. The battery pack according to claim 2, wherein the fixing groove extends partially into the fixing wall in the horizontal direction without extending completely through the fixing wall.

* * * * *